United States Patent
Sakai et al.

(10) Patent No.: US 9,001,397 B2
(45) Date of Patent: Apr. 7, 2015

(54) IMAGE READING APPARATUS WITH TRANSPORT DEVICE CONTROL

(75) Inventors: Norikazu Sakai, Kanagawa (JP); Kazunori Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 766 days.

(21) Appl. No.: 13/112,766

(22) Filed: May 20, 2011

(65) Prior Publication Data
US 2012/0113482 A1     May 10, 2012

(30) Foreign Application Priority Data
Nov. 8, 2010 (JP) .................................. 2010-249937

(51) Int. Cl.
| H04N 1/04 | (2006.01) |
| H04N 1/12 | (2006.01) |
| H04N 1/203 | (2006.01) |
| H04N 1/407 | (2006.01) |
| H04N 1/10 | (2006.01) |
| H04N 1/193 | (2006.01) |

(52) U.S. Cl.
CPC ............ *H04N 1/121* (2013.01); *H04N 1/1225* (2013.01); *H04N 1/2032* (2013.01); *H04N 1/4076* (2013.01); *H04N 1/1013* (2013.01); *H04N 1/193* (2013.01); *H04N 2201/044* (2013.01); *H04N 2201/0456* (2013.01)

(58) Field of Classification Search
CPC ... H04N 1/121; H04N 1/2032; H04N 1/1013; H04N 1/1225; H04N 1/4076; H04N 1/193
See application file for complete search history.

(56) References Cited

U.S. PATENT DOCUMENTS

| 7,694,963 | B2 * | 4/2010 | Iwago et al. ............. 271/258.01 |
| 2003/0151778 | A1 * | 8/2003 | Tsutsumi ..................... 358/474 |
| 2006/0164695 | A1 * | 7/2006 | Tokutsu ....................... 358/498 |
| 2010/0220344 | A1 * | 9/2010 | Tashiro et al. ............... 358/1.13 |

FOREIGN PATENT DOCUMENTS

| JP | 2001-94735 A | 4/2001 |
| JP | 2005-159952 A | 6/2005 |
| JP | 2007-104533 A | 4/2007 |
| JP | 2007-208878 A | 8/2007 |
| JP | 2009-088695 A | 4/2009 |

OTHER PUBLICATIONS

Communication dated Nov. 4, 2014 from the Japanese Patent Office in counterpart application No. 2010-249937.

* cited by examiner

*Primary Examiner* — Benny Q Tieu
*Assistant Examiner* — Sunil Chacko
(74) *Attorney, Agent, or Firm* — Sughrue Mion, PLLC (57) ABSTRACT

An image reading apparatus includes an apparatus body; a transport device that is openable and closable; an image reading unit disposed in one of the apparatus body and the transport device and reading an image of the document transported by the transport device; a member to be read that is disposed in the other of the apparatus body and the transport device at a position opposite the image reading unit when the transport device is closed, the member to be read being read by the image reading unit; and a control unit that causes the image reading unit to read the member to be read at a predetermined time, and if the transport device is open at the predetermined time, causes the image reading unit to read the member to be read when the document is transported by the transport device.

19 Claims, 8 Drawing Sheets

IMAGE READING APPARATUS WITH TRANSPORT DEVICE CONTROL

CROSS-REFERENCE TO RELATED APPLICATIONS

This application is based on and claims priority under 35 USC 119 from Japanese Patent Application No. 2010-249937 filed Nov. 8, 2010.

BACKGROUND

Technical Field

The present invention relates to an image reading apparatus.

SUMMARY

According to an aspect of the invention, an image reading apparatus includes an apparatus body; a transport device that is openable and closable relative to the apparatus body, the transport device transporting a document to a predetermined position of the apparatus body when the transport device is closed relative to the apparatus body; an image reading unit disposed in one of the apparatus body and the transport device, the image reading unit reading an image of the document transported by the transport device; a member to be read that is disposed in the other of the apparatus body and the transport device, the member to be read being disposed at a position opposite the image reading unit when the transport device is closed, the member to be read being read by the image reading unit; and a control unit that causes the image reading unit to read the member to be read at a predetermined time, and if the transport device is open at the predetermined time, causes the image reading unit to read the member to be read when the document is transported by the transport device.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the drawings.

Figure 1:
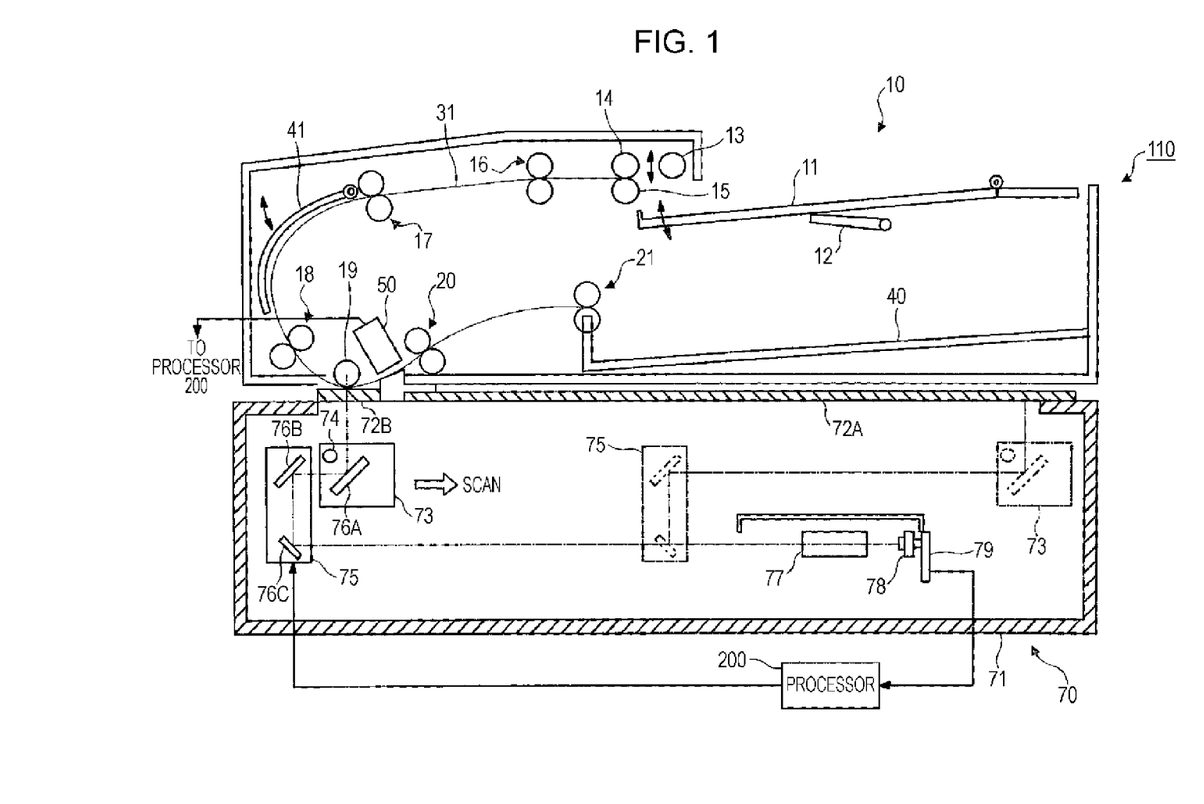
FIG. 1 illustrates an image reading apparatus according to the exemplary embodiment.

FIG. 1 illustrates an image reading apparatus 110 according to the present exemplary embodiment. The image reading apparatus 110 includes a scanner 70, a document feeder 10 (an example of a transport device), and a processor 200 (an example of a control unit). The scanner 70 scans and reads an image. The document feeder 10 transports a document toward a second platen glass 72B (described below) of the scanner 70. The processor 200 controls components of the document feeder 10 and the scanner 70, and processes a signal of the read image.

The document feeder 10 includes a first document stacker 11 and a lifter 12. A stack of documents is placed on the first document stacker 11. The lifter 12 lifts and lowers the first document stacker 11. The document feeder 10 further includes a transport roller 13, a feed roller 14, and a retard roller 15. The transport roller 13 transports the documents placed on the first document stacker 11, which has been lifted by the lifter 12. The feed roller 14 transports the documents, which have been transported by the transport roller 13, further downstream. The retard roller 15 separates the documents, which have been transported by the transport roller 13, into individual sheets. Take-away rollers 16 and pre-registration rollers 17 are disposed in a document transport path 31 along which the document is transported. The take-away rollers 16 transport the separated document toward rollers that are disposed downstream. The pre-registration rollers 17 transport the document further downstream and cause the document to form a loop.

Registration rollers 18 are disposed in the document transport path 31. The registration rollers 18 temporarily stop and then restart rotating at an appropriate timing, and supply the document to a document reading section while performing registration adjustment. A platen roller 19 and outside rollers 20 are disposed in the document transport path 31. The platen roller 19 assists transportation of the document while the document is being read. The outside rollers 20 transport the read document further downstream. A baffle 41 is disposed in the document transport path 31. The baffle 41 rotates around a pivot in accordance with the looped shape of the transported document. An image reading unit 50 (an example of an image reading unit) is disposed between the platen roller 19 and the outside rollers 20. The image reading unit 50 reads an image of a document that is being transported by the document feeder 10. A second sheet stacker 40 and output rollers 21 are disposed downstream of the outside rollers 20. Documents that have been read are stacked on the second sheet stacker 40. The output rollers 21 output the documents onto the second sheet stacker 40.

In a standby state, the transport roller 13 is lifted and held in a retracted position. When transporting a document, the transport roller 13 is lowered to a nip position (document transport position) and transports the uppermost document on the first document stacker 11. The feed roller 14 transports the document, which has been transported by the transport roller 13, further downstream. The pre-registration rollers 17 cause the document to form a loop by pressing the leading end of the document against the registration rollers 18 that are not rotating. At the registration rollers 18, the leading end of the document, which has contacted the registration rollers 18 when forming the loop, is returned to a nip position. While the loop is being formed, the baffle 41 rotates around the pivot so as not to prevent the document from forming the loop. The take-away rollers 16 and the pre-registration rollers 17 maintain the loop while the document is being read. Because the document forms the loop, the timing for reading the document is adjusted, and a skew of the document is suppressed.

The scanner 70, which serves as an example of an apparatus body, has an apparatus frame 71 that supports the document feeder 10, and the scanner 70 reads an image of the document while the document is being transported by the document feeder 10. The scanner 70 includes a first platen glass 72A and the second platen glass 72B, which are disposed in an upper part of the apparatus frame 71. A document to be read is placed on the first platen glass 72A. A light opening, through which an image of a document transported by the document feeder 10 is read, is formed in the second platen glass 72B.

In the present exemplary embodiment, the document feeder 10 is configured to be rotatable around a pivot disposed in a rear part of the image reading apparatus 110, so that the document feeder 10 may be opened and closed relative to the scanner 70. In the present exemplary embodiment, the document feeder 10 is rotated and moved upward around the pivot when setting a document on the first platen glass 72A. A document placed on the first platen glass 72A is covered by the document feeder 10 when the document feeder 10 is lowered and closed.

The scanner 70 includes a full rate carriage 73 that reads an image either while at rest under the second platen glass 72B or while scanning across the entire area of the first platen glass 72A. The scanner 70 includes a half rate carriage 75 that supplies light obtained from the full rate carriage 73 to an image forming section. The full rate carriage 73 includes an illumination lamp 74 and a first mirror 76A. The illumination lamp 74 irradiates a document with light. The first mirror 76A receives reflected light reflected from the document.

The half rate carriage 75 includes a second mirror 76B and a third mirror 76C, which supply light obtained from the first mirror 76A to the image forming section. The scanner 70 includes an image forming lens 77 and a charge coupled device (CCD) image sensor 78. The image forming lens 77 optically reduces an optical image obtained from the third mirror 76C. The CCD image sensor 78 photoelectrically converts the optical image formed by the image forming lens 77. The scanner 70 includes a driver circuit board 79 that converts an analog image signal obtained by the CCD image sensor 78 into a digital image signal. The digital image signal is sent to the processor 200.

When reading an image of a document placed on the first platen glass 72A, the full rate carriage 73 and the half rate carriage 75 move by distances in the ratio of 2:1 in the scanning direction (indicated by an outline arrow). At this time, a surface of a document to be read is irradiated with light emitted by the illumination lamp 74 of the full rate carriage 73. Reflected light from the document is reflected by the first mirror 76A, the second mirror 76B, and the third mirror 76C in this order, and is guided to the image forming lens 77. The light guided to the image forming lens 77 forms an image on the light-receiving surface of the CCD image sensor 78. The CCD image sensor 78 is a one-dimensional sensor that reads one line at a time. The full rate carriage 73 reads one line (in the main scanning direction), moves in a direction (sub-scanning direction) perpendicular to the main scanning direction, and reads the next line of the document. One page of the document is read by repeating this operation over the entire size of the document.

A document transported by the document feeder 10 passes over the second platen glass 72B when the document is read. In this case, the full rate carriage 73 and the half rate carriage 75 are at rest at positions illustrated by solid lines in FIG. 1. Reflected light reflected by the first line of the document that has passed the platen roller 19 of the document feeder 10 is reflected by the first mirror 76A, the second mirror 76B, and the third mirror 76C. Then, the light is focused by the image forming lens 77, and the CCD image sensor 78 reads an image.

The CCD image sensor 78, which is a one-dimensional sensor, reads one line extending in the main scanning direction at a time. Then, the CCD image sensor reads the next one line extending in the main scanning direction of the document, which is transported by the document feeder 10. Subsequently, when the trailing end of the document passes the reading position of the second platen glass 72B, reading of one page in the sub-scanning direction is finished. In the present exemplary embodiment, when the CCD image sensor 78 reads a first surface of the document, the image reading unit 50 simultaneously reads a second surface of the document. This allows both surfaces of the document to be read without transporting the document plural times. Here, the term "simultaneously" does not mean a complete coincidence in time, but means "in the same document transportation cycle".

Figure 2:
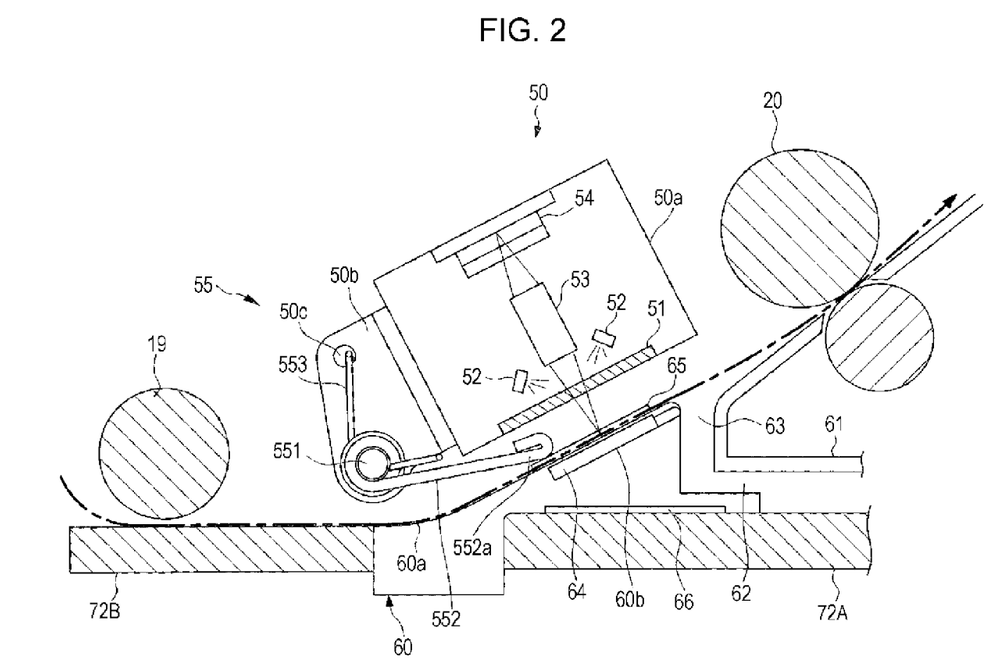
FIG. 2 illustrates an image reading unit.

FIG. 2 illustrates the image reading unit 50.

As illustrated in FIG. 2, the image reading unit 50, which is an example of an image reading unit, is disposed between the platen roller 19 and the outside rollers 20. The image reading unit 50 has an oblong shape extending in a direction perpendicular to (intersecting) the document transport direction. To be specific, the image reading unit 50 extends from the front side to the rear side of the image reading apparatus 110. The first surface of the document is pressed against the second platen glass 72B, and the image of the first surface is read by the CCD image sensor 78 as described above. The image of the second surface of the document is read by the image reading unit 50.

The image reading unit 50 includes a housing 50a, a glass member 51, and a light emitting diode (LED) 52. The housing 50a is open toward the document transport path. The glass member 51 is attached to the opening side of the housing 50a. The LED 52, which is disposed in the housing 50a, irradiates the second surface of the document with light passing through the glass member 51. The image reading unit 50 includes a SELFOC lens (registered trademark) 53 that collects reflected light reflected from the document. The image reading unit 50 further includes a line sensor 54 that receives the light collected by the SELFOC lens 53 and that photoelectrically converts the light. An analog image signal obtained by the line sensor 54 is converted into a digital image signal and sent to the processor 200 (see FIG. 1).

In the present exemplary embodiment, a CCD sensor is used as the line sensor 54. The image reading unit 50 captures an image by using the SELFOC lens 53 and the line sensor 54, without using a reducing optical system. Therefore, the image reading unit 50 has a simple structure. Moreover, the size of the housing of the image reading unit 50 and the power consumption of the image forming unit 50 are reduced. In the present exemplary embodiment, a three-row RGB color sensor is used as the line sensor 54 to read a color image.

A pressing unit 55 is attached to the image reading unit 50. The pressing unit 55 presses a document toward the scanner 70. The pressing unit 55 includes a base portion 50b that is attached to the housing 50a of the image reading unit 50. The base portion 50b is attached to one of the side surfaces of the housing 50a that is positioned on the upstream side in the document transport direction. The pressing unit 55 includes a guide member 552 that is attached to the base portion 50b and that extends downstream in the document transport direction.

On the scanner 70 side, an opposing member 60 is disposed at a position opposite the image reading unit 50 with the document transport path therebetween. To be specific, in the present exemplary embodiment, the image reading unit 50 is disposed in one of two regions that face each other with the document transport path therebetween, and the opposing member 60 is disposed in the other of the two regions. To be more specific, the image reading unit 50 is disposed on the document feeder 10 side, and the opposing member 60 is disposed on the scanner 70 side. In the present exemplary embodiment, a guide 61 is disposed downstream of the opposing member 60. An opening 63 is formed between the guide 61 and the opposing member 60. A dust retainer 62, for collecting dust generated due to documents, is disposed at a position that is below the guide 61 and that is continuous with the opening 63.

The guide member 552 is a plate-shaped member, and one end portion of the guide member 552 is wound around and supported by a rotation shaft 551 disposed in the base portion 50b, whereby the guide member 552 is rotatably supported by the rotation shaft 551. The other end portion of the guide member 552 is a free end that extends toward the opposing member 60. In the present exemplary embodiment, the image reading unit 50 includes a torsion spring 553. The torsion spring 553, which has two arms, is wound around the rotation shaft 551. The end of one of the arms is inserted into a through hole 50c formed in the base portion 50b, and the end of the other of the arms urges the guide member 552 toward the opposing member 60. The base portion 50b is formed at each of the ends of the image reading unit 50, which extends in the depth direction of the image reading apparatus 110. The rotation shaft 551 and the torsion spring 553 are also disposed at each of the ends.

The guide member 552 extends from the front side to the rear side in the depth direction of the image reading apparatus 110. In the present exemplary embodiment, the guide member 552 is made of a metal plate, such as a stainless steel plate. A bent portion 552a is formed at the free end of the guide member 552 by using a hemming process. The bent portion 552a contacts a document. In the present exemplary embodiment, the bent portion 552a is formed so as to prevent contact between a document and an edge of the guide member 552. In the present exemplary embodiment, the guide member 552 is made of a metal plate and configured to be twistable using the torsion spring 553, so that the thickness of a transported document is absorbed. Moreover, a document having a crease is stably transported.

The opposing member 60 includes a document transport surface 60a and a stepped surface 60b. The document transport surface 60a, which guides a transported document, is disposed in an upstream portion of the opposing member 60 in the document transport direction. The stepped surface 60b is disposed in a downstream portion of the opposing member 60 in the document transport direction. The stepped portion 60b is formed at a level lower than that of the document transport surface 60a. The stepped surface 60b intersects with an extension line passing through the SELFOC lens 53 and the focal point of light collected by the SELFOC lens 53. A white reference tape 64, which is a biaxially oriented polyester film, is affixed to the stepped surface 60b. In the present exemplary embodiment, the upper surface of the white reference tape 64 is exposed toward the document transport path and is located at a position slightly recessed from the upper side of the document transport surface 60a (away from the transport path). The white reference tape 64 is disposed as a position opposite the image reading unit 50 when the document feeder 10 is closed, and serves as a member to be read by the image reading unit 50 when the document feeder 10 is closed.

Ribs 65, which extend in the document transport direction, are formed on the transport path side (in an upper part) of the opposing member 60. The ribs 65 are formed at ends of the opposing member 60 in a direction perpendicular to the document transport direction. The ribs 65 are made of a resin and are integrally formed with the opposing member 60. In the present exemplary embodiment, the guide member 552 is urged by the torsion spring 553 and thereby pressed against the ribs 65.

Thus, a gap corresponding to the height of the ribs 65 is formed between the guide member 552 and the document transport surface 60a of the opposing member 60. In the present exemplary embodiment, a white reference plate 66 is affixed to the upper surface of the first platen glass 72A at a position below the opposing member 60.

Although not described above, the image reading unit 50, which uses the SELFOC lens 53 as an optical image forming lens, has a depth of focus (depth of field) of about ±0.3 mm, which is as small as about 1/13 of that of the scanner 70. Therefore, when the image reading unit 50 reads a document, it is required that the document reading position be in a small area. To fulfill this requirement, the pressing unit 55 is provided in the present exemplary embodiment. The pressing unit 55 presses a transported document against the opposing member 60 to stabilize the position of the document, which is located between the platen roller 19 and the outside rollers 20.

Figure 3:
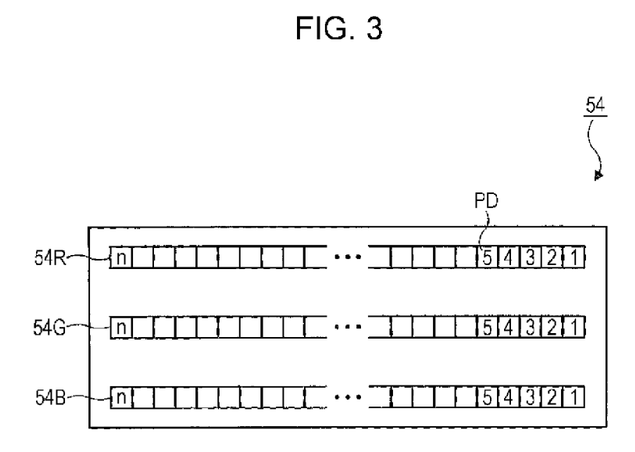
FIG. 3 illustrates a line sensor.

FIG. 3 illustrates the line sensor 54.

The line sensor 54 includes three line sensors 54R, 54G, and 54B, respectively corresponding to three colors R, G, and B so as to detect three color components R, G, and B. The line sensors 54R, 54G, and 54B are arranged in the main scanning direction. Each of the line sensors 54R, 54G, and 54B includes plural photoelectric conversion elements (photodiodes (PD), light-receiving elements). To be specific, the line sensor 54 includes three line sensors that are arranged with a predetermined distance therebetween, and each of the three line sensors includes n photoelectric conversion elements.

Figure 4:
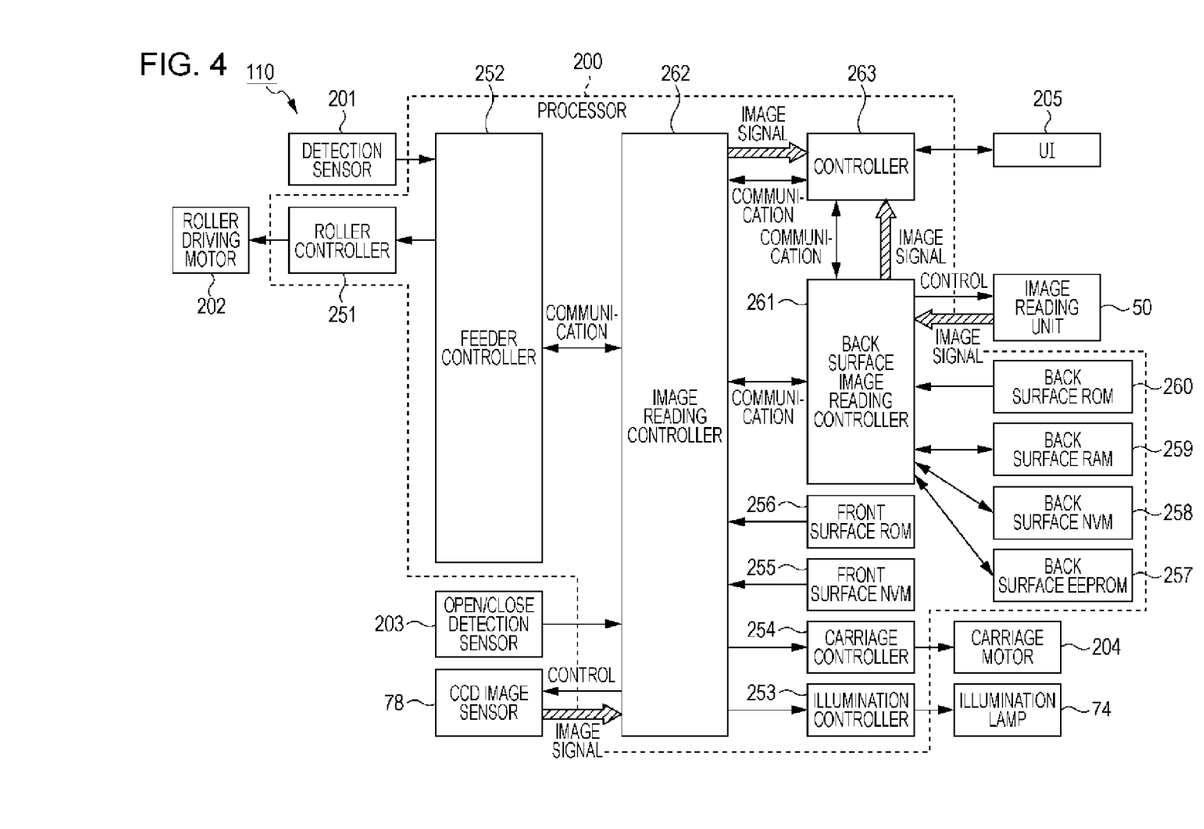
FIG. 4 is a block diagram of the image reading apparatus.

FIG. 4 is a block diagram of the image reading apparatus 110.

Although not described above, the document feeder 10 of the image reading apparatus 110 includes a detection sensor 201 and a roller driving motor 202. The detection sensor 201 detects a transported document. The roller driving motor 202 drives the transport roller 13 and the feed roller 14, which are used to transport the document. The image reading apparatus 110 includes an open/close detection sensor 203, a carriage motor 204, and a user interface (UI) 205. The open/close detection sensor 203 detects whether the document feeder 10 is open or closed. The carriage motor 204 moves the full rate carriage 73 and the half rate carriage 75. The UI 205 includes a display panel, which display information for a user, and receives information from the user.

The processor 200 includes a roller controller 251 and a feeder controller 252. The roller controller 251 controls the roller driving motor 202 and thereby controls the transport roller 13, the feed roller 14, and the like. The feeder controller 252 controls the roller controller 251 and receives a detection result from the detection sensor 201. The processor 200 includes an illumination controller 253 and a carriage controller 254. The illumination controller 253 controls the illumination lamp 74 to turn on or off the illumination lamp 74. The carriage controller 254 controls the carriage motor 204 and thereby controls the full rate carriage 73 and the half rate carriage 75. The processor 200 includes a front surface nonvolatile memory (NVM) 255 and a front surface read only memory (ROM) 256. The front surface NVM 255 stores, for example, parameters that are used when reading the front surface (first surface) of a document. The front surface ROM 256 stores, for example, a program that is used when reading the front surface of the document.

The processor 200 includes a back surface electrically erasable programmable read-only memory (EEPROM) 257 and a back surface NVM 258, which store parameters and the like that are used when reading an image on the back surface (second surface) of a document. The processor 200 includes a back surface random access memory (RAM) 259 and a back surface ROM 260. The back surface RAM 259 is used as, for example, a work area when executing various programs. The back surface ROM 260 stores, for example, a program that is used when reading an image on the back surface of the document.

The processor 200 includes a back surface image reading controller 261 that controls reading of an image on the back surface of a document. The back surface image reading controller 261 is connected to the back surface EEPROM 257, the back surface NVM 258, the back surface RAM 259, and the back surface ROM 260. The back surface image reading controller 261 is connected to the image reading unit 50, receives an image signal from the line sensor 54 of the image reading unit 50, and outputs the image signal.

The processor 200 includes an image reading controller 262 that controls reading of an image on the front surface of the document. The image reading controller 262 receives an image signal from the CCD image sensor 78 and outputs the image signal. The processor 200 includes a controller 263. The controller 263 is capable of performing communication with the back surface image reading controller 261, the image reading controller 262, and the UI 205. The controller 263 receives image signals from the back surface image reading controller 261 and the image reading controller 262, and outputs the image signals to an external apparatus.

Next, processes performed by the image reading apparatus 110 will be described.

Figure 5:
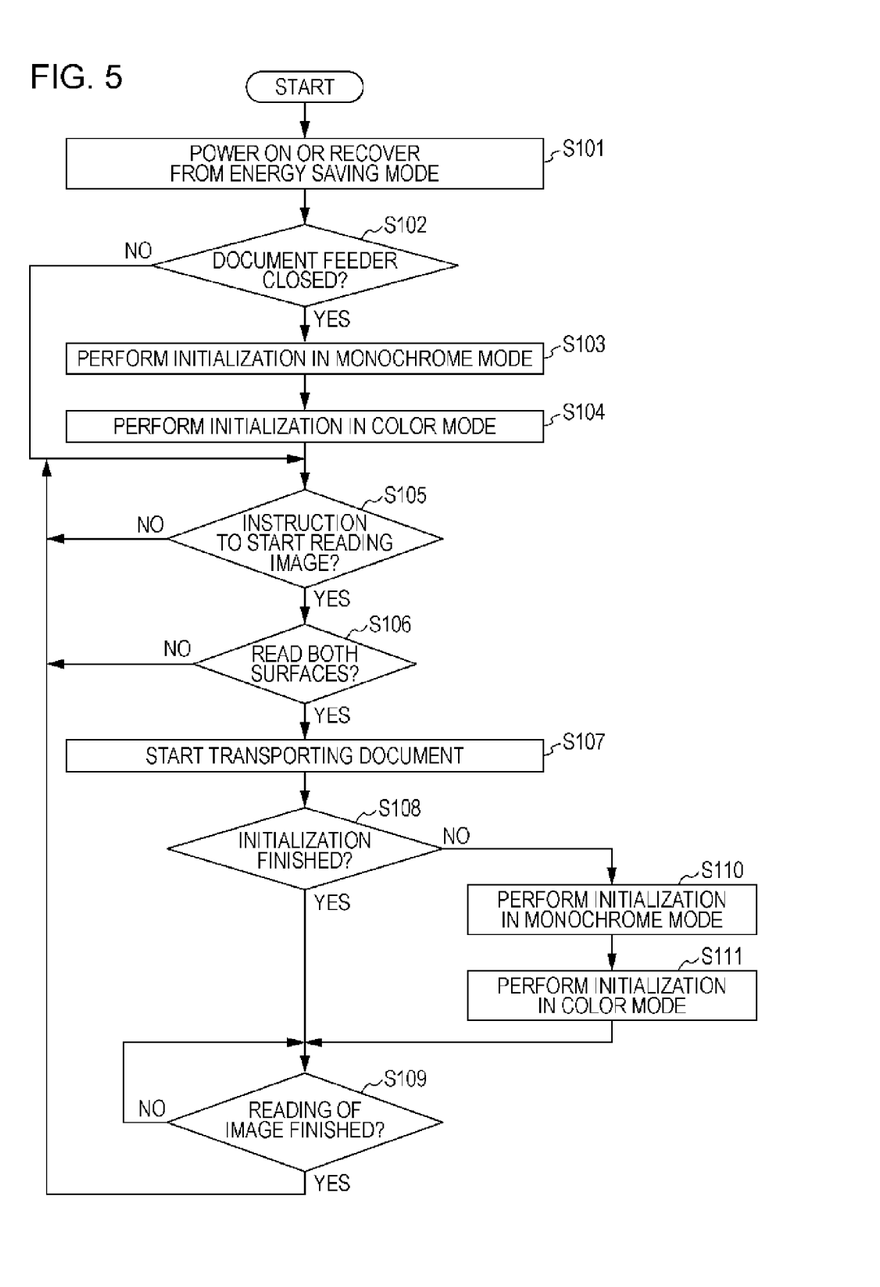
FIG. 5 is a flowchart illustrating a process performed from the time when the image reading apparatus is powered on or recovers from an energy-saving mode to the time when reading of an image is finished.

FIG. 5 is a flowchart illustrating a process performed from the time when the image reading apparatus 110 is powered on or recovers from an energy-saving mode to the time when reading of an image is finished. This flowchart illustrates a process performed by the document feeder 10 when reading images on both surfaces of a document.

When the image reading apparatus 110 is powered on or recovers from the energy-saving mode (step S101), whether the document feeder 10 is open or closed is determined on the basis of an output of the open/close detection sensor 203 (step S102). This determination is made by the image reading controller 262.

If it is determined that the document feeder 10 is closed, initialization in a monochrome mode (an example of a first reading condition) is performed (step S103). To be specific, the values of the exposure period, the gain, and the emission intensity of the LED 52 are set at those for the monochrome mode. Next, the LED 52 is turned on, and a gain adjustment (gain control) of the level (white level) of a signal that is output from the line sensor 54 is performed. Next, the LED 52 is turned off, and an offset adjustment (offset control) of the level (black level) of the signal output from the line sensor 54 is performed. Subsequently, the LED 52 is turned on, and shading data (hereinafter referred to as "black and white shading data") is obtained.

Subsequently, in the present exemplary embodiment, initialization in a color mode (an example of a second reading condition) is performed (step S104). To be specific, the values of the exposure period, the gain, and the emission intensity of the LED 52 are set at those for the color mode. Next, as in the above-described case, a gain adjustment (gain control) of the level (white level) of a signal output from the line sensor 54 is performed. Next, the LED 52 is turned off, and an offset adjustment (offset control) of the level (black level) of the signal output from the line sensor 54 is performed. Subsequently, the LED 52 is turned on, and shading data (hereinafter referred to as "color shading data") is obtained.

If it is not determined in step S102 that the document feeder 10 is closed, i.e., that the document feeder 10 is open, steps S103 and S104 are omitted, and the process proceeds to step S105. That is, the initialization in the monochrome mode and the initialization in the color mode are omitted, and the process proceeds to step S105.

Figure 6:
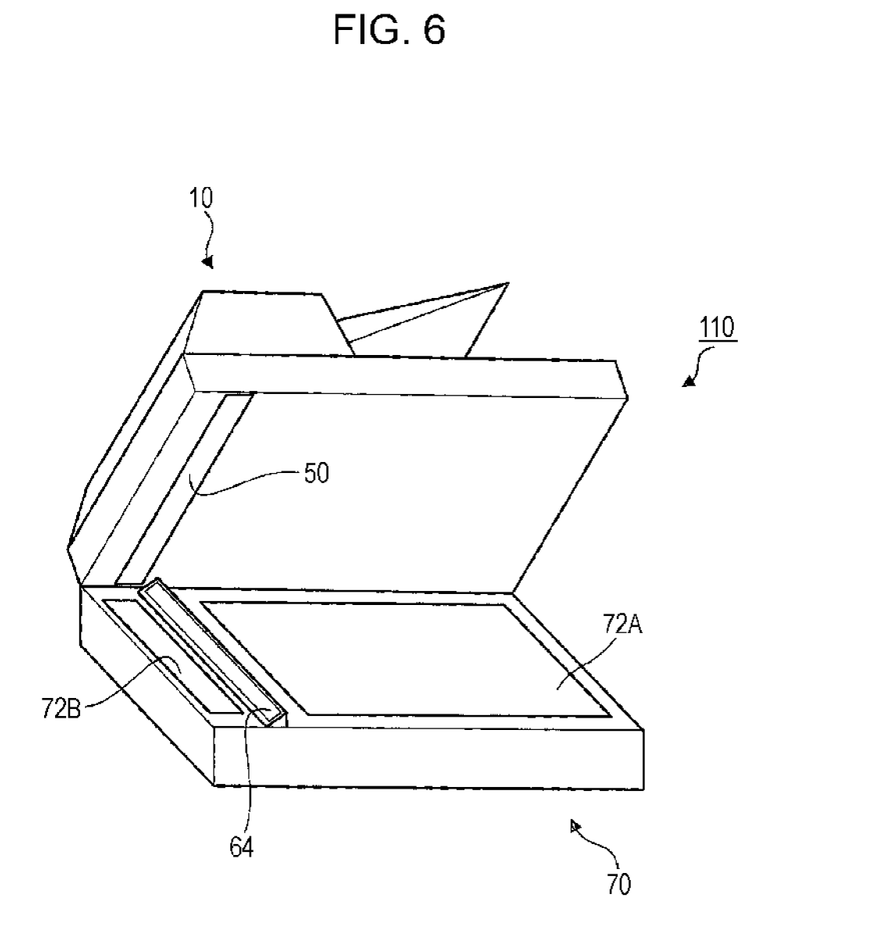
FIG. 6 illustrates a state of the image reading apparatus.

When the document feeder 10 is open as illustrated in FIG. 6 (which illustrates a state of the image reading apparatus 110), the image reading unit 50 is located not at a position opposite the white reference tape 64 but at a position away from the white reference tape 64. In this case, reading of the white reference tape 64 by the image reading unit 50 becomes difficult, and the initialization in the monochrome mode and the initialization in the color mode are not performed in predetermined manners. Therefore, in the present exemplary embodiment, when the document feeder 10 is open as described above, steps S103 and S104 are omitted, and the process proceeds to step S105.

Next, in the present exemplary embodiment, whether or not a control signal that instructs the image reading apparatus 110 to start reading an image has been received is determined (step S105). If it is determined that the control signal has been received, whether or not reading of images on both surfaces of the document has been instructed is determined (step S106). If it is determined in step S105 that the control signal, which instructs the image reading apparatus 110 to start reading an image has not been received, or if it is determined in step S106 that reading of images on both surfaces of the document has not been instructed, the process returns to step S105. Although not described above, the image reading apparatus 110 has a start button (not shown), and when a user presses the start button, the control signal that instructs the image reading apparatus 110 to start reading an image is received.

If it is determined in step S106 that reading of images on both surfaces of the document has been instructed, transportation of the document is started (step S107), and reading of the images on the document is started. Next, in the present exemplary embodiment, whether or not the initialization in the monochrome mode and the initialization in the color mode have been finished is determined (step S108). If it is determined in step S108 that these initializations have been finished, whether or not reading of the images on the document has been finished is determined in step S109. If it is determined that reading of the images has been finished, the process returns to step S105.

If it is not determined in step S108 that the initialization in the monochrome mode and the initialization in the color mode have not been finished, these initializations are performed. That is, the initialization in the monochrome mode is performed in step S110, and the initialization in the color mode is performed in step S111. The operation of step S110 is the same as that of step S103, and the operation of step S111 is the same as that of step S104.

In the present exemplary embodiment, the operations of steps S110 and S111 are performed after the operation of step S107 has been finished (i.e., the initializations are performed after transportation of the document has been started), so that reading of image is started and finished earlier. To be specific, the initialization in the monochrome mode and the initialization in the color mode are performed while the document is being transported. Therefore, reading of images is started earlier and finished earlier than in the case where reading of images (transportation of the document) is started after the initialization in the monochrome mode and the initialization in the color mode have been finished.

The initializations may be finished before the leading end of a transported document (the leading end of the first document that is transported) reaches the second platen glass 72B. However, it may happen that the initializations have not been finished before the leading end of the transported document reaches the second platen glass 72B. In such a case, for example, the document may be stopped before the document reaches the second platen glass 72B. Then, transportation of the document may be restarted after the initializations have been finished. If the initializations have not been finished before the leading end of the transported document reaches the second platen glass 72B, the transport speed of the document may be temporarily reduced.

In the process illustrated in FIG. 5, the initializations are performed if instruction to start reading an image has been received. This is because, if the instruction to start reading an image has been received, it is highly likely that a user has closed the document feeder 10, so that it is highly likely that the image reading unit 50 is located at a position opposite the position of the white reference tape 64. When performing the initializations in steps S110 and S111, whether or not the document feeder 10 is closed may be determined on the basis of an output from the open/close detection sensor 203, which functions as a part of a detection unit. In this case, the initializations in steps S110 and S111 are reliably prevented from being performed when the document feeder 10 is open.

If the document feeder 10 is open when performing the initializations in steps S110 and S111, for example, transportation of the document may be temporarily stopped and a message such as "Please close the document feeder 10." may be displayed on the UI 205. Then, when the document feeder 10 is closed, the initializations may be performed and transportation of the document may be restarted.

Next, another process performed by the image reading apparatus 110 will be described.

Figure 7:
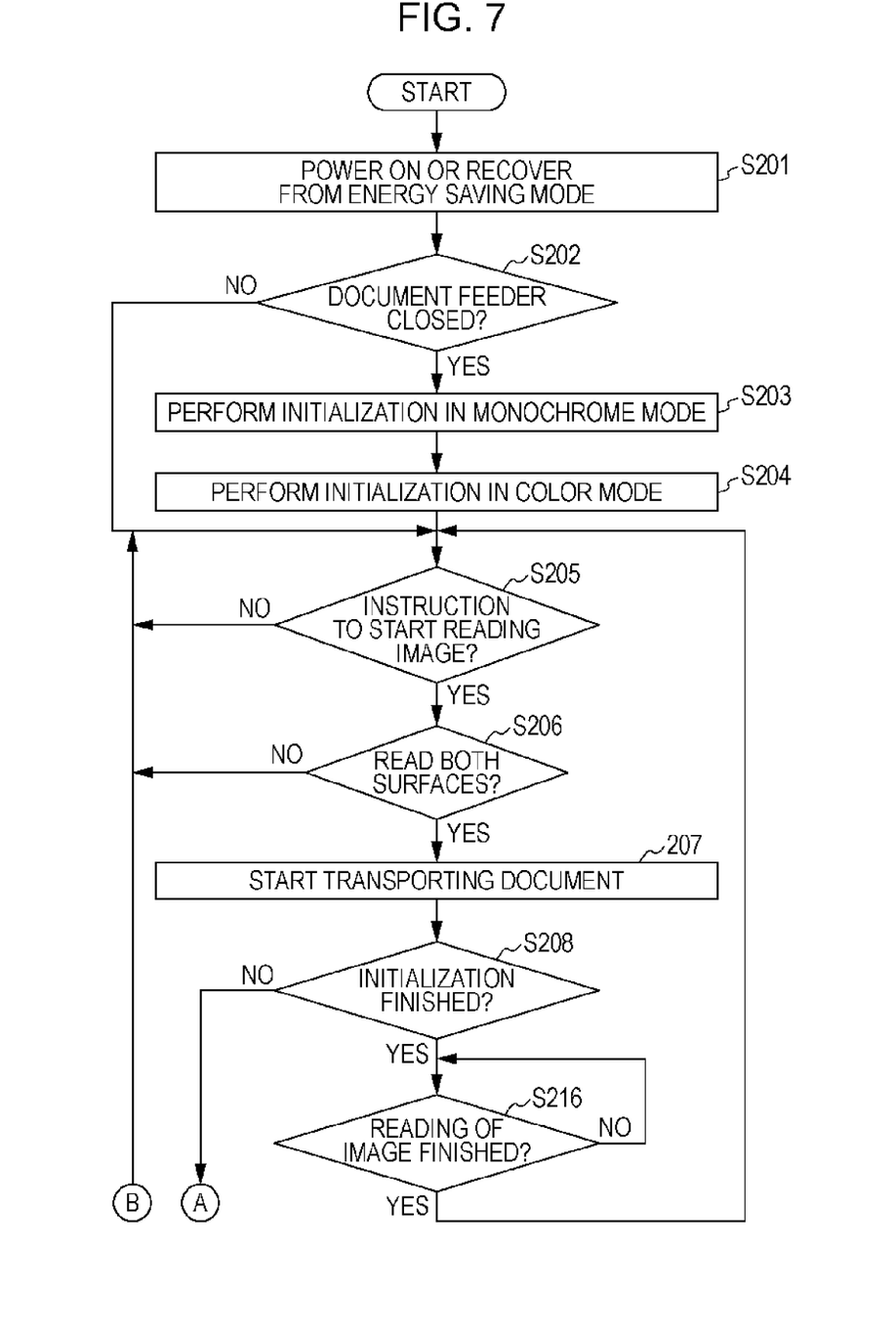
FIG. 7 is a flowchart illustrating another process performed by the image reading apparatus.
Figure 8:
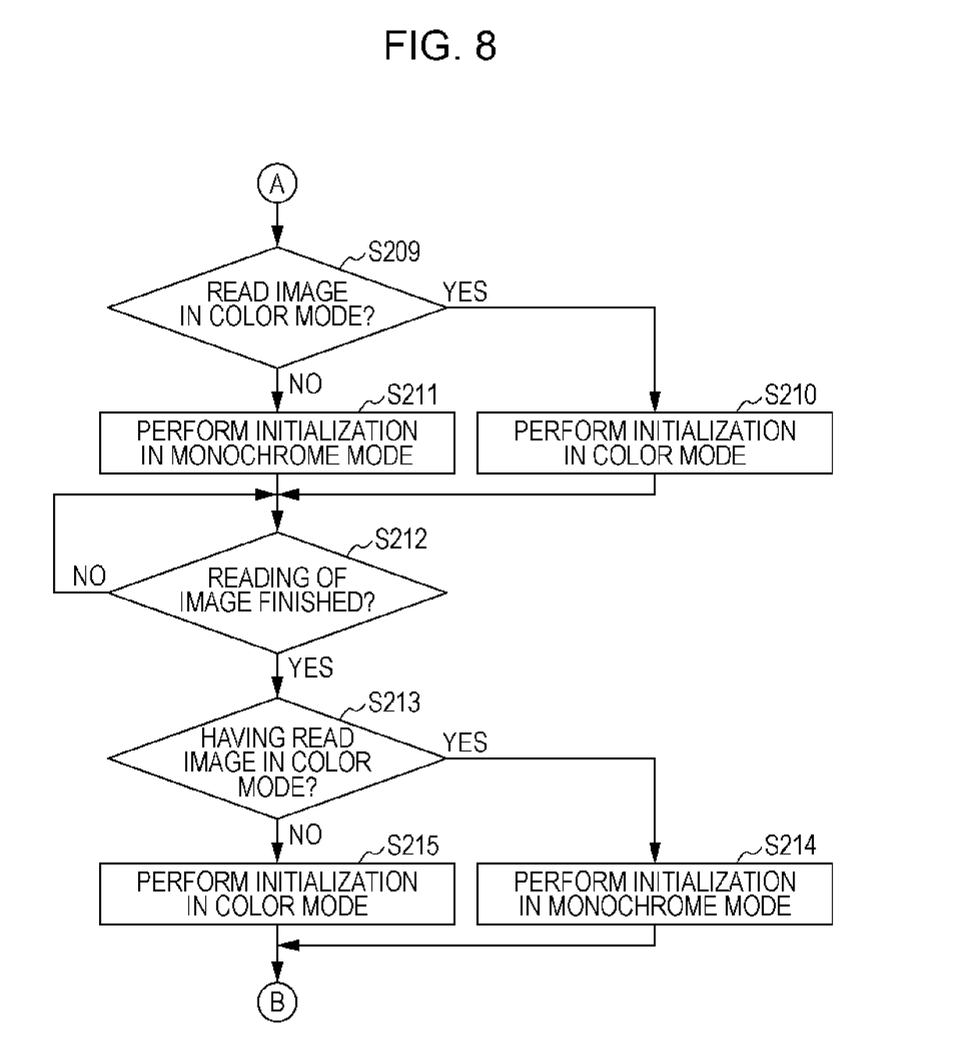
FIG. 8 is a flowchart illustrating the other process performed by the image reading apparatus.

FIGS. 7 and 8 illustrate a flowchart illustrating another process performed by the image reading apparatus 110. As in the above-described case, the process illustrated in this flowchart is performed by the document feeder 10 when reading images on both sides of a document.

Operations of steps S201 to S208 are the same as those of steps S101 to S108. That is, when the image reading apparatus 110 is powered on or recovers from the energy-saving mode (step S201), whether the document feeder 10 is open or closed is determined (step S202). Next, if it is determined that the document feeder 10 is closed, initialization in the monochrome mode is performed (step S203), and initialization in the color mode is performed (step S204). If it is determined in step S202 that the document feeder 10 is not closed, the initialization in the monochrome mode and the initialization in the color mode are omitted as in the above described case.

Subsequently, whether or not a control signal that instructs the image reading apparatus 110 to start reading an image has been received is determined (step S205). Then, whether or not reading of images on both surfaces of the document has been instructed is determined (step S206). If it is determined that reading of images on both surfaces of the document has been instructed, transportation of the document is started (step S207). Subsequently, whether or not the initialization in the monochrome mode and the initialization in the color mode have been finished is determined (step S208). If it is determined in step S208 that the initialization in the monochrome mode and the initialization in the color mode have been finished, whether or not reading of the images on the document has been finished is determined in step S216 as in the above-described case. If it is determined that reading of the images has been finished, the process returns to step S205.

In the present exemplary embodiment, if it is determined in step S208 that the initialization in the monochrome mode and the initialization in the color mode have not been finished, whether or not the images on the document are to be read in the color mode is determined (step S209). If the images are to be read in the color mode, the initialization in the color mode is performed (step S210). If the images are to be read in the monochrome mode, the initialization in the monochrome mode is performed (step S211).

After the operation of step S210 or the operation of step S211 has been finished, in the present exemplary embodiment, whether or not reading of images has been finished is determined (step S212). If it is determined in step S212 that reading of images has been finished, whether the images have been read in the color mode is determined (step S213). If the images have been read in the color mode, the initialization in the monochrome mode is performed (step S214). If the images have been read not in the color mode but in the monochrome mode, the initialization in the color mode is performed (step S215). To be specific, in the present exemplary embodiment, the initialization in the mode in which the images are to be read is performed in step S210 or step S211, and the initialization in the mode other than the mode in which the images are to be read is performed in step S214 or step S215.

In the process illustrated in FIG. 5, the initialization in the monochrome mode and the initialization in the color mode are performed before the document reaches the image reading unit 50. Depending on the transport speed of the document, the two initializations may not be finished before the document reaches the image reading unit 50. Therefore, in the process illustrated in FIG. 7, the initialization in the mode in which the images on the document are to be read (the initialization needed to read the images on the document) is performed first, and then the initialization in the mode other than the mode in which the images on the document are to be read is performed after reading of the images have been finished.

In the present exemplary embodiment, the initialization in the other mode is performed after reading of the images has been finished and before reading of images on the next document is started (after step S212 and before step S205). However, the initialization in the other mode may be performed after reading of the images on the next document has been started (after an instruction to start reading the images on the next document has been received (after step S205)).

In the present exemplary embodiment, images are read in the color mode or in the monochrome mode. However, depending on the quality of an image to be read, there may be other modes. In such a case, initializations in all modes may be performed sequentially as illustrated in FIG. 5, or initialization in one of the modes may be first performed and initializations in the remaining modes may be performed after reading of an image has been finished as described in FIG. 7.

For example, whether initializations in all modes will be finished before the first document reaches the image reading unit 50 (the reading position of the image reading unit 50) may be determined beforehand, and if it is determined that the initializations in all modes will not be finished, initializations in some the modes may be performed first and initializations in the remaining modes may be performed afterward. In this case, for example, if the transport speed of the document is low, the initializations in all modes are performed beforehand, and if the transport speed of the document is high, initializations in some of the modes are performed beforehand and initializations in the remaining modes are performed afterward.

In the case where the initializations in some of the modes are performed beforehand and the initializations in the remaining modes are performed after reading of images on the document has been finished, it may happen that the document feeder 10 is opened while the initializations in the remaining modes are being performed. On the other hand, if the initializations in all modes are performed before the first document reaches the image reading unit 50, it is unlikely that the document feeder 10 is opened while the initializations are being performed.

If the document feeder 10 is open when the power is turned on or the like, predetermined initial parameters may be used. However, in such a case, the predetermined parameters such as the temperature, humidity, and the like may be inappropriate for the image reading condition at the time, and the quality of a read image may be reduced. If the document feeder 10 is open when the power is turned on or the like, for example, the initialization may be performed after the document feeder 10 has been closed by a user. However, the user may open or close the document feeder 10 irrespective of the initialization. Therefore, if the initialization is performed after the document feeder 10 has been closed by a user, it may happen that the user may open or close the document feeder 10 while the initialization is being performed. In this case, inappropriate parameters may be set.

Therefore, in the present exemplary embodiment, initialization is performed when it is unlikely that the document feeder 10 is opened. To be specific, the initialization is performed while reading of an image of a document is being performed (while the document is being transported). When performing the initialization while reading of an image of a document is being performed, the document may be transported after the initialization has been finished as described above. In this case, however, the productivity is reduced. Therefore, in the present exemplary embodiment, the document is transported before the initialization has been finished. In other words, the initialization is performed while the document is being transported.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an apparatus body;
   a transport device that is openable and closable relative to the apparatus body, the transport device transporting a document to a predetermined position of the apparatus body when the transport device is closed relative to the apparatus body;
   an image reading unit disposed in one of the apparatus body and the transport device, the image reading unit reading an image of the document transported by the transport device;
   a reference member that is disposed in the other of the apparatus body and the transport device, the reference member being disposed at a position opposite the image reading unit when the transport device is closed, the reference member being read by the image reading unit; and
   a control unit that causes the image reading unit to determine whether the transport device is open with respect to the apparatus body at a predetermined time, and when it is determined that the transport device is closed at the predetermined time, the control unit controls the image reading unit to read the reference member before the transport device starts transporting the document, and when it is determined that the transport device is open at the predetermined time, the control unit causes the image reading unit to read the reference member after the transport device starts transporting of the document.

2. The image reading apparatus according to claim 1, wherein, if the control unit causes the image reading unit to read the reference member after the transport device starts transporting the document, the control unit causes the image reading unit to read the document while the document is being transported toward the image reading unit by the transport device.

3. The image reading apparatus according to claim 2, wherein, when transporting the document toward the image reading unit, the transport device temporarily stop transporting the document or temporarily reduces a transport speed of the document.

4. The image reading apparatus according to claim 3, further comprising:
   a detection unit that detects whether the transport device is closed,
   wherein, in response to the detection unit detecting that the transport device is closed after the transport device starts transporting the document, the control unit causes the image reading unit to read the reference member.

5. The image reading apparatus according to claim 2, further comprising:
   a detection unit that detects whether the transport device is closed,
   wherein, in response to the detection unit detecting that the transport device is closed after the transport device starts transporting the document, the control unit causes the image reading unit to read the reference member.

6. The image reading apparatus according to claim 1, further comprising:
   a detection unit that detects whether the transport device is closed,
   wherein, in response to the detection unit detecting that the transport device is closed after the transport device starts transporting the document, the control unit causes the image reading unit to read the reference member.

7. The image reading apparatus according to claim 1, wherein the reference member comprises a white reference.

8. The image reading apparatus according to claim 1, wherein the reference member comprises a film.

9. An image reading apparatus comprising:
   an apparatus body;
   a transport device that is openable and closable relative to the apparatus body, the transport device transporting a document to a predetermined position of the apparatus body when the transport device is closed relative to the apparatus body;
   an image reading unit disposed in one of the apparatus body and the transport device, the image reading unit reading an image of the document transported by the transport device;
   a reference member that is disposed in the other of the apparatus body and the transport device, the reference member being disposed at a position opposite the image reading unit when the transport device is closed, the reference member being read by the image reading unit; and a control unit that causes the image reading unit to read the reference member in a first reading condition and a second reading condition at a predetermined time, and if the transport device is closed at the predetermined time, causes the image reading unit to read the reference member before the transport device starts transporting the document, and if the transport device is open at the predetermined time, causes the image reading unit to read the reference member in the first reading condition after the transport device starts transporting the document and an image of the document is read by the image reading unit in the first reading condition, and causes the image reading unit to read the reference member in the second reading condition after the transport device starts transporting the document and the document has passed through the image reading unit and reading of the image of the document has been finished.

10. The image reading apparatus according to claim 9, wherein, if the control unit causes the image reading unit to read the reference member in the first reading condition after the transport device starts transporting the document and the image of the document is read by the image reading unit in the first reading condition, the control unit causes the image reading unit to read the reference member in the first reading condition while the document is being transported toward the image reading unit by the transport device.

11. The image reading apparatus according to claim 10, wherein, if the image reading unit is able to read the reference member in the first and second reading conditions after the transport device starts transporting the document, the control unit causes the image reading unit to read the reference member in the first and second reading conditions before the document reaches the image reading unit.

12. The image reading apparatus according to claim 11, wherein the predetermined time is a time when the image reading apparatus is powered on or a time when the image reading apparatus recovers from a standby state.

13. The image reading apparatus according to claim 10, wherein the predetermined time is a time when the image reading apparatus is powered on or a time when the image reading apparatus recovers from a standby state.

14. The image reading apparatus according to claim 9, wherein, if the image reading unit is able to read the reference member in the first and second reading conditions after the transport device starts transporting the document, the control unit causes the image reading unit to read the reference member in the first and second reading conditions before the document reaches the image reading unit.

15. The image reading apparatus according to claim 14, wherein the predetermined time is a time when the image reading apparatus is powered on or a time when the image reading apparatus recovers from a standby state.

16. The image reading apparatus according to claim 9, wherein the predetermined time is a time when the image reading apparatus is powered on or a time when the image reading apparatus recovers from a standby state.

17. The image reading apparatus according to claim 9, wherein the reference member comprises a white reference.

18. The image reading apparatus according to claim 9, wherein the reference member comprises a film.

19. An image reading apparatus comprising:
a scanner;
a document feeder that is openable and closable relative to the scanner, the document feeder transporting a document to a position of the scanner when the document feeder is closed relative to the scanner;
an image reading unit disposed in one of the scanner and the document feeder, the image reading unit reading an image of the document transported by the document feeder;
a white reference tape that is disposed in the other of the scanner and the document feeder, the white reference tape being disposed at a position opposite the image reading unit when the document feeder is closed; and
a control unit that causes the image reading unit to determine whether the document feeder is open with respect to the scanner, and when it is determined that the document feeder is closed, the control unit controls the image reading unit to read the white reference tape before the document feeder starts transporting the document, and when it is determined that the document feeder is open, the control unit causes the image reading unit to read the white reference tape after the document feeder starts transporting of the document.

* * * * *